United States Patent [19]

Frank

[11] 4,098,374

[45] Jul. 4, 1978

[54] RAILROAD CLASSIFICATION YARDS
[75] Inventor: Earl E. Frank, Tallman, N.Y.
[73] Assignee: Abex Corporation, New York, N.Y.
[21] Appl. No.: 775,380
[22] Filed: Mar. 7, 1977
[51] Int. Cl.² ............................................. B61K 7/08
[52] U.S. Cl. ..................................................... 188/62
[58] Field of Search ....................... 188/62; 246/182 A
[56] References Cited
U.S. PATENT DOCUMENTS

| 3,340,963 | 9/1967 | Garrett et al. | 188/62 |
| 3,621,942 | 11/1971 | Danieli | 188/62 |

Primary Examiner—Duane A. Reger
Attorney, Agent, or Firm—Kinzer, Plyer, Dorn & McEachran

[57] ABSTRACT

A system for exchanging hydraulic fluid between a pump, a retarder and a reservoir in a railroad classification yard in which a pump housing and a control unit housing are supported independently outboard of opposite sides of the classification track with conduits reduced to a minimum and connected to the housings by hoses.

18 Claims, 6 Drawing Figures

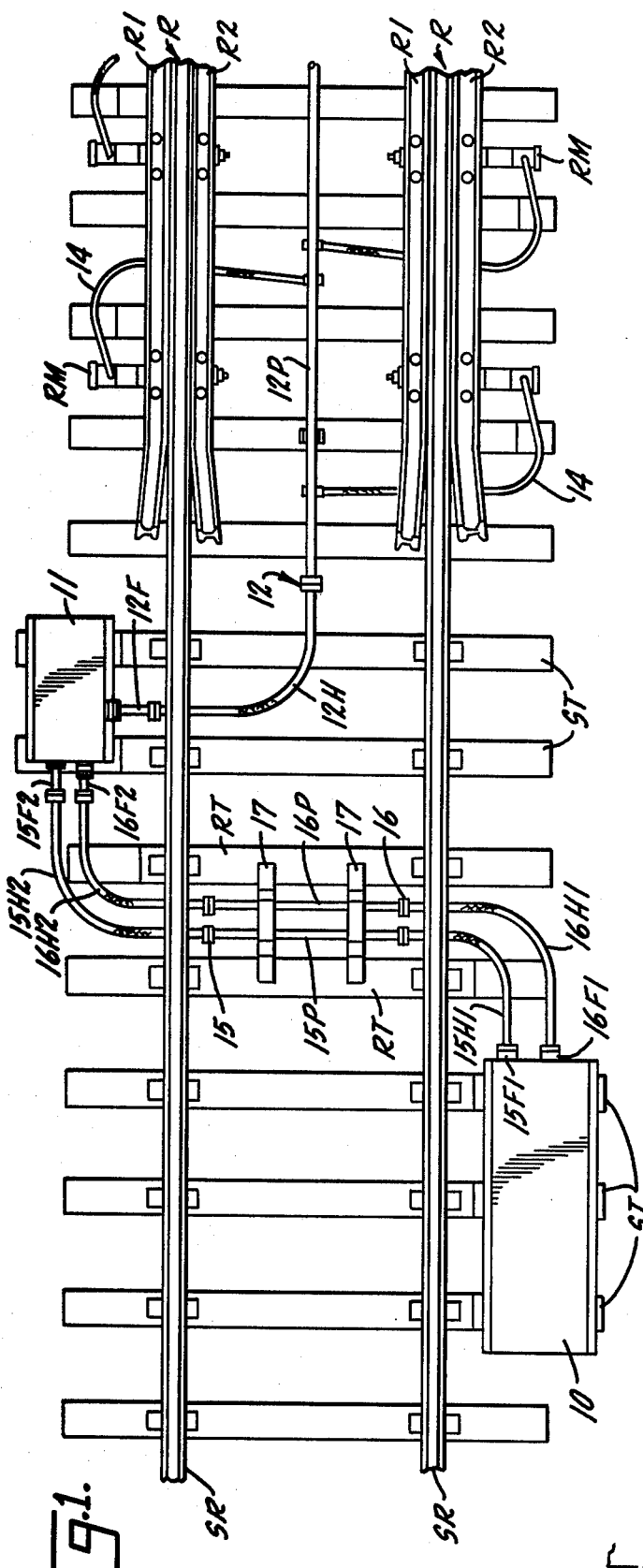
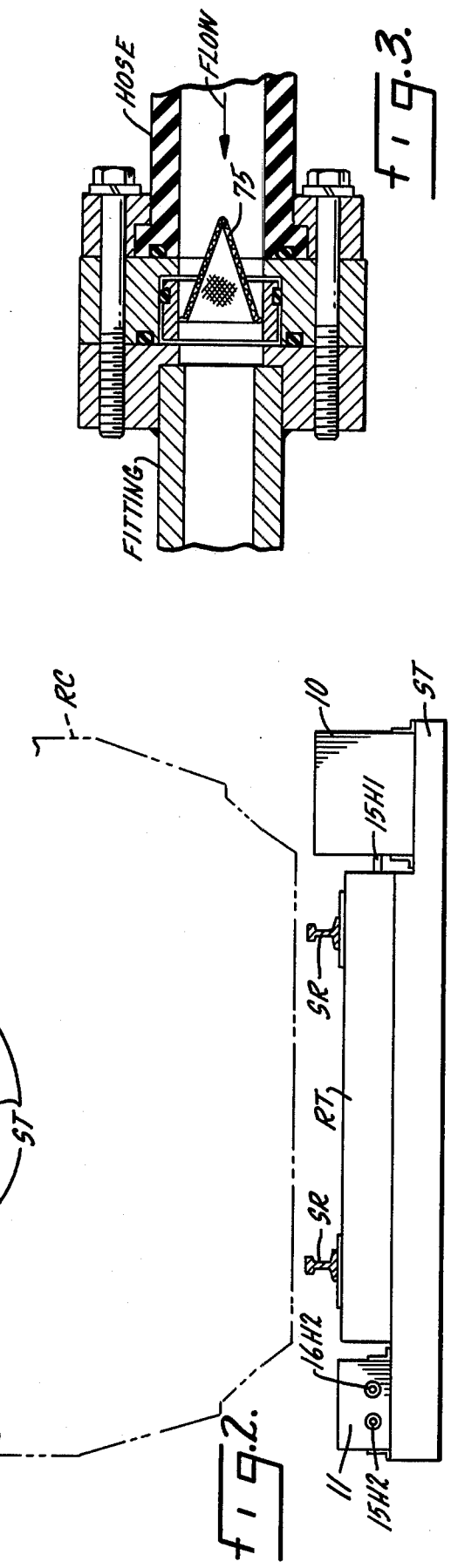

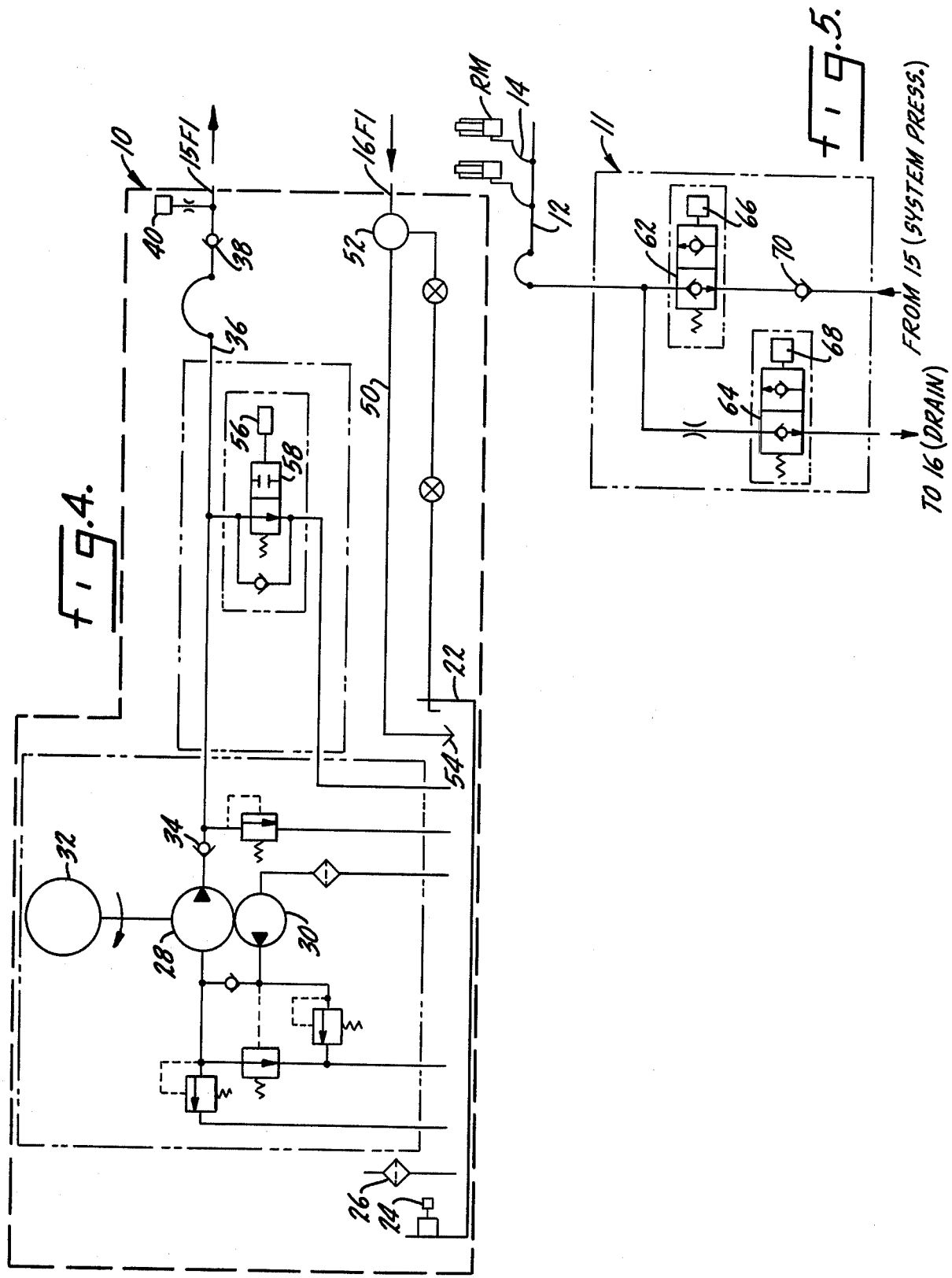

RAILROAD CLASSIFICATION YARDS

This invention relates to a system for exchanging or distributing hydraulic fluid between a pump, a retarder and a reservoir in a railroad classification yard.

The invention was prompted by recognizing the possibility that regulations of Public Utility Commissions could be surmounted by separating the pump-reservoir unit from certain control components, or that such separation would also enable the amount of piping, that is, the footage of piping to be considerably reduced.

The foregoing objects and other objects will be discussed below in connection with FIGS. 1 and 2.

In the Drawing:

FIG. 1 is a plan view of a portion of a classification track in a railroad classification yard and showing the manner in which the present invention may be reduced to practice in one embodiment;

FIG. 2 is an elevational view showing the outline of a railroad car juxtaposed above a pump housing and a control unit housing supported in accordance with the present invention;

FIG. 3 is a detailed view showing the installation of a filter screen;

FIG. 4 is a diagrammatic view of certain components in a control unit housing;

Figure 6:
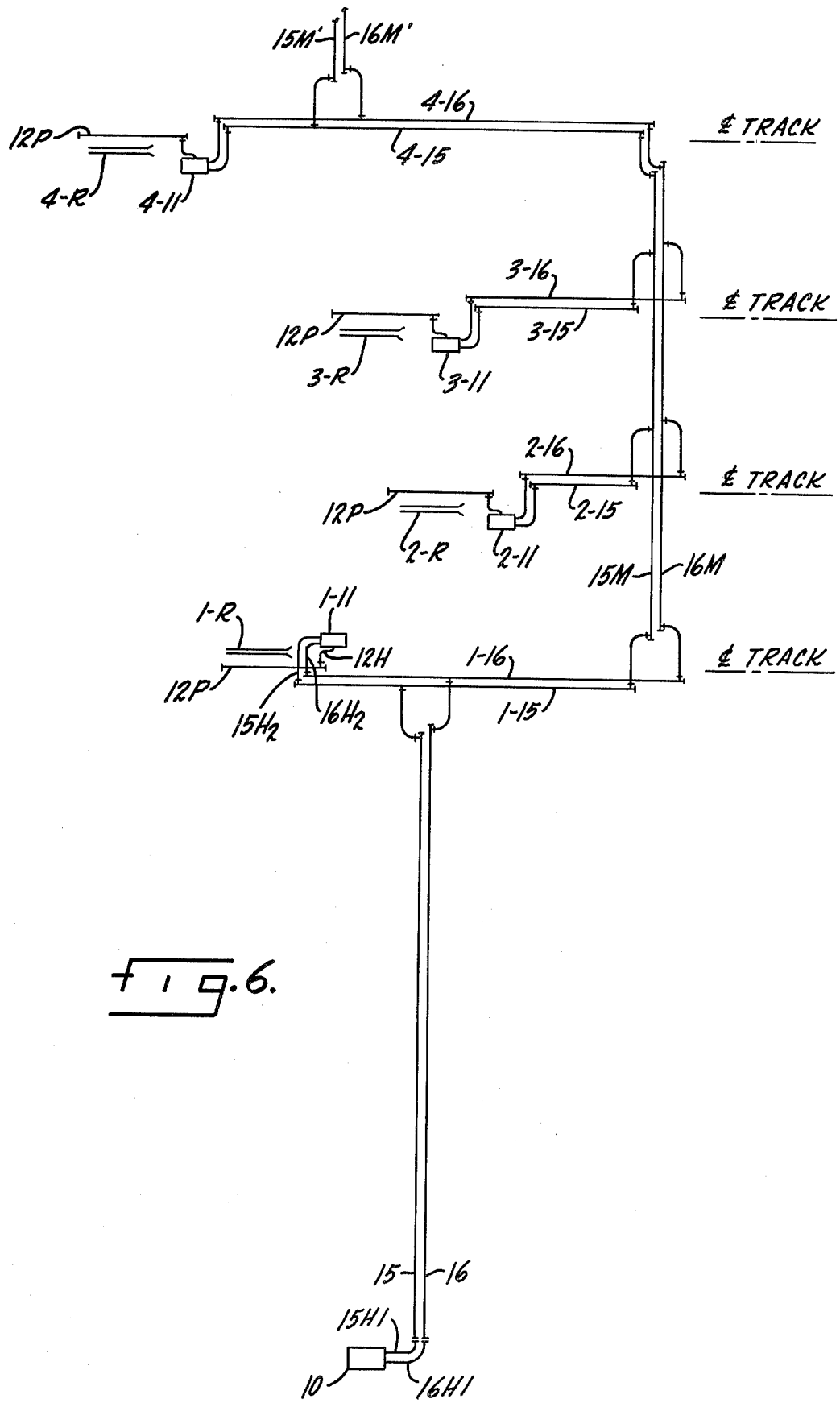
FIG. 6 is a diagram of a typical classification yard installation incorporating features of the present invention.

The installation shown in FIG. 1 involves a single classification track in a railroad classification yard, the track comprising two stock rails SR. A retarder is installed at the classification track shown in FIG. 1. This retarder is a double retarder in that retarder rails R1 and R2 are paired on opposite sides of each of the stock rails SR. The stock rails repose on rail ties RT. In some situations it is enough that the retarder consist only of a single pair of retarder rails R1 and R2 positioned on opposite sides of only one of the stock rails, constituting a retarder R.

The retarder R may be assumed to be of the character shown in U.S. Pat. No. 3,621,943 of Earl E. Frank. This retarder is a normally closed retarder, normally closed by strong coil springs, so that a railroad car to be slowed, approaching from the left as viewed in FIG. 1, encounters the closed retarder rails R1 and R2 which are effective to slow the car to a predetermined speed. After a predetermined speed has been reached, hydraulic fluid under pressure is supplied to retarder rams RM, opening the retarder.

Under the present invention a housing 10 for a pumping unit is located on one side of the classification track, outboard of the adjacent stock rail SR, and a separate housing 11, containing controls, is located on the opposite side of the track, outboard of the related stock rail SR; there are intervening ties RT between the two housings for reasons explained below.

A further characteristic feature of the present invention is that both return fluid and hydraulic fluid under pressure, for return from and delivery to the rams RM is carried in a single conduit 12 located between the two stock rails SR and extending parallel thereto. The conduit 12 comprises a rigid pipe 12P and a hose 12H connected to one end thereof. The hose 12H is bent to extend transverse to the path of the classification track and at its end opposite the pipe 12P is connected to a fitting 12F extending outward of the side of the control housing 11 adjacent the related stock rail SR.

The bend in the hose is adjusted to a smooth curve of large enough radius not to obstruct fluid flow or render it unacceptably non-laminar. This is true of all other bends.

The cylinder of each ram RM is communicated to pipe 12P by individual hoses 14. From this it will be seen that pipe 12P is flexibly connected to the control housing 11 by the hose 12H and by the same token the individual retarder rams RM are flexibly connected to pipe 12P by the hoses 14. Flexure of pipe 12P for any reason does not necessarily twist fitting 12F nor the connection to the rams. Since pipe 12P is located between the stock rails and not at one side, there will be no infringement of PUC space allotment discussed below.

A conduit 15 extends between housings 10 and 11 and this conduit is adapted to supply the retarder rams with fluid at system pressure. A second conduit 16 also extends between housings 10 and 11 and this conduit is adapted to return fluid from the rams to a reservoir or tank inside housing 10. The two conduits, as shown in FIG. 1, are parallel to one another and extend transversely to the path of the classification track; again PUC limitations are met.

The conduit 15 incorporates a rigid pipe 15P located between and extending parallel to a pair of rail ties RT which support the stock rails SR. One end of pipe 15P has a hose 15H1 connected thereto and this hose is bent so that the opposite end thereof may be connected to a fitting 15F1 extending outward of one end of housing 10.

In like manner a hose 15H2 at one end is connected to pipe 15P and at its opposite end is connected to a fitting 15F2 projecting outward at the end of the control housing 11 facing housing 10.

Pipe 16P for return fluid is connected in an identical manner to fittings at the adjacent ends of the pump housing 10 and the control housing 11.

The pipes 15P and 16P are spaced and supported by a pair of brackets as 17 in turn having their ends secured to the rail ties RT shown in FIG. 1.

Again it will be seen that the ends of the pipes 15P and 16P are flexibly connected respectively to the fittings included as a part of the pump housing 10 and the control housing 11.

The outline of a railroad car RC shown in FIG. 2 helps to explain many of the objects of the present invention. There are prevailing regulations (Public Utility Commission — PUC) which require that equipment located between adjacent tracks may not extend outward of the widest car RC and the reason for this is to allow ample space for a person who may be trapped between cars moving on adjacent tracks. One additional fact helpful in understanding the objectives of the present invention is that the capacity of the pumping unit inside housing 10 is sufficient to handle a double set of retarders, of the kind shown in FIG. 1, on one to sixteen, or more, different tracks with six tracks active simultaneously. Ordinarily a retarder capacity of that magnitude would require an enormous amount of piping at great expense and, because of the amount of piping, would entail greatly increasing the output of the pump compared to the present invention.

Therefore, in accordance with one objective of the present invention, the distribution system for hydraulic fluid is so arranged that the amount of piping is held to a minimum while enabling compliance with PUC regulations of the kind mentioned above in connection with FIG. 2, and at the same time the chance for a break in the conduits is reduced.

Thus, and referring to FIG. 1, by assigning the pump components to one housing 10 and the control components to another housing 11, located on opposite sides of the track, it is possible to keep the sizes of the housings to a minimum so that neither one projects beyond the allowable limits shown in FIG. 2. With a pump of a capacity contemplated under the present invention, capable of actuating retarders on six tracks simultaneously, it would not be possible to combine both the pumping components and the control components in a single housing on one side of the track without infringing on the lateral projection limits discussed in connection with FIG. 2. Also by assigning the controls to a single housing, there can be as many housings (on adjacent classification tracks) as retarders, all supplied by a single pumping unit.

Also, by separating or isolating the two housings 10 and 11 and arranging for a longitudinal separation therebetween characterized by one or more intervening rail ties, and by employing both hoses and pipes, vertical up and down movement of one housing or the other, due to a defective road bed, or uneven loading, does not necessarily result in similar motion of the other housing and therefore the connections are even less likely to be broken if severe motions are encountered. This same effect can be visualized in terms of the manner in which the conduit 12 is connected between housing 11 and the retarder units.

It can also be visualized that if both housings 10 and 11 are on the same side of the track, the conduits joining the two, if straight, can be broken by any force tending to separate the housings in a longitudinal sense. Admittedly this can be dealt with by employing S-shaped hoses but that would involve immense bends, not only infringing on the space allowances discussed in connection with FIG. 2, but also interfering with an exchange of fluid.

The pump housing 10, FIG. 4, includes a reservoir 22 having a level which is sensed by a float switch 24. The oil level may be maintained from time to time by adding oil through a breather 26 equipped with a filter.

A high pressure pump 28 and a low pressure pump 30 are driven by an electric motor 32 inside housing 10.

When the pumps are operating, the low pressure pump 30 delivers fluid under pressure to the inlet of the high pressure pump and the outlet of the high pressure pump delivers system fluid, under pressure, through a check valve 34 to an internal conduit or passage 36.

The internal conduit 36 includes a check valve 38, positioned downstream of check valve 34, and also a pressure switch 40 located downstream of check valve 38. The pressure switch 40 is adjustable so that system pressure may be varied.

The pump housing contains additional components in the form of pressure relief valves and unloaders which are conventional.

The outlet of conduit 36, downstream of the adjustable pressure switch 40, is connected by means of fitting 15F1 to the external hose 15H1 which supplies fluid under pressure to the control unit. The return hose 16H1, FIG. 1, is connected to a fitting 16F1 on the pump housing 10 in turn communicating with a corresponding internal conduit 50, inside the pump housing as shown in FIG. 4, enabling return oil to be delivered to the oil reservoir 22. The return oil is filtered by a filter 52 and just prior to entering the reservoir 22 the velocity of the return oil is reduced by a diffuser 54.

When fluid pressure reaches the desired pressure for the system, determined by the setting of the pressure switch 40, the pressure switch 40 is actuated and this in turn de-energizes a solenoid 56 which controls an unloader valve 58. The position of the unloader valve 58, with its control solenoid 56 de-energized, is shown in FIG. 4 and under this condition the unloader valve 58 merely diverts high pressure fluid to the tank when the pumps are operating.

The essential components at the control station are shown in FIG. 5. Thus, inside housing 11 there is a solenoid operated valve 62 and another solenoid operated valve 64, each of which includes two oppositely directed ball check valves. Valve 62 is in effect interposed between conduit 12 and conduit 15 (system return) and valve 64 is in effect interposed between conduit 12 and the return conduit 16.

Valve 62 incorporates two check valves the operation of which is apparent in FIG. 5. Thus, when solenoid 66 associated with valve 62 is energized, valve 62 is shifted and fluid under pressure may actuate the retarder rams; when this solenoid is de-energized the system pressure line is blocked thereby preventing fluid under pressure from flowing to the rams.

When solenoid 68 associated with valve 64 is energized, the retarder conduit 12 is blocked from returning fluid to the reservoir, thereby maintaining pressure in the retarder rams. When solenoid 68 is de-energized, on the other hand, fluid under pressure in the retarder rams may be exhausted through the return conduit 16 back to the reservoir 22.

A check valve 70, FIG. 5, prevents reverse flow in the system pressure line, retaining pressure in the rams when supplied.

The directional control valves 62 and 64 are fail safe in that unless a signal is originated to energize both solenoids 66 and 68 the retarder rams cannot be operated to open the retarder which, remaining closed, will stop a car rather than allow it to pass.

In order to reduce the possibility of chips fouling the pumps or eroding the ram surfaces a replaceable screen 75, FIG. 3, or other formanious chip tray of conical form is interposed in both the system return line and system pressure line, preferably where the hoses 15H2 and 16H2 are connected to the pipes or fittings 15F2 and 16F2 extending from housing 11. The apex of the screen points upstream as shown in FIG. 3 so that chips, as they accumulate, will move up the sides toward the base, preserving the screen passages for efficient fluid flow.

A convenient way to support the housings 10 and 11 is apparent from FIG. 2; extra long support ties ST are located beneath the rail ties RT with extended ends of ample dimension located outboard of the rail ties serving as rigid supports for the housings 10 and 11 secured to the upper surfaces thereof.

As mentioned, the pumping unit (28–30–32) is of sufficiently large capacity to service the control units of six retarders of the form shown in FIG. 1 and the manner in which this may be accomplished will be described below in connection with FIG. 6.

OPERATION

The control unit inside housing 11 has a manually positionable switch which can be set for either "remote" or "local" operation, that is, the control may be operated automatically from a remote position or may be operated manually on the spot. There is a similar switch on the pumping unit.

The following explanation of operation assumes a remote operation and the sequence of events, regardless, is the same when accomplished locally.

As already noted the retarder units may be assumed as normally closed under spring pressure in accordance with the construction disclosed in my U.S. Pat. No. 3,621,943. When the retarder is to be opened, a corresponding signal will be originated at a remote position resulting in simultaneous energization of solenoids 66 and 68 and also the motor for the pump. Solenoid 66, being energized, will position valve 62 so that hydraulic fluid under pressure will be directed to the retarder rams. On the other hand, solenoid 68 being energized, valve 64 will be positioned to retain pressure in the retarder ram line, preventing any flow into the system return line.

The retarder rams will extend and the system pressure will increase to open the retarder and release the car as intended; pressure switch 38 will detect when full system pressure is achieved, whereupon solenoid 56 is energized locating unloader valve 58 in the position shown in FIG. 4.

To allow the retarder to close under spring pressure only requires that the hydraulic system be depressurized and again a signal is originated from a remote position resulting in de-energization of solenoids 66 and 68. Resultantly, valves 62 and 64 assume the position shown in FIG. 5. With valve 62 in the position shown in FIG. 5, hydraulic fluid is prevented from entering the retarder ram line 12 and with valve 64 in the position shown in FIG. 5 hydraulic fluid from the retarder rams is directed to the system return line; consequently, when the system is not operating the retarders remain in a closed position.

As mentioned above, a pumping unit as 10 is capable of servicing the retarder on one to sixteen, or more, different track installations; an installation of that magnitude, limited to a showing of only four of the track retarders R, is shown in FIG. 6, retarders 1-R, 2-R, 3-R and 4-R. The pumping unit 10 may be remotely positioned laterally of the classification tracks on which the retarders are installed; the center lines of the four different track sections are denoted by the standard center line symbol in FIG. 6.

The system pressure conduits and system return conduits, consistent with the description above, are identified by reference characters 15 and 16 throughout the entire installation, FIG. 6; special cases are denoted by a pre-fix.

There are four control units 11 each with its own directional control valve means, of the form described above, for independently controlling the flow of fluid under pressure to the retarder ram pipes 12P which service the rams for each of the retarders, FIG. 6. Where a bend is required, when connecting one pipe to another, or connecting a pipe to the pump unit or control unit, hoses as 12H, 15H1, 15H2, 16H1 and 16H2 previously described, are employed precisely as explained above.

The pressure supply and fluid return conduits 15 and 16, communicating at one end respectively with the pump and reservoir inside housing 10, extend transversely to the tracks and at the opposite end are connected to a first set of branch pipes 1-15 and 1-16 by hoses as shown. The branch pipes 1-15 and 1-16 parallel their track and at one end are connected by hoses to the appropriate fittings of control unit 1-11.

At the opposite ends, branch pipes 1-15 and 1-16 are connected by hoses respectively to a pressure pipe manifold 15M and a return pipe manifold 16M. These manifolds are parallel to one another and extend transverse to the tracks; they are supported between the ties by brackets or straps as 17, FIG. 1.

The manifolds 15M and 16M service the pressure and supply branch pipes of the additional retarders 2-R, 3-R and 4-R; branch pipes 4-15 and 4-16 may be tapped by additional manifolds 15M' and 16M'.

It will be seen from this that the principles embodied in the installation shown in FIG. 1 may be extended so that one pump unit, remotely positioned as shown in FIG. 6, may service a plurality of retarders, in which event the pump unit 10, FIG. 6, may be located at a considerable wayside distance from the classification tracks and not necessarily supported by ties ST. However, each of the control units as 1-11 can be supported on separate support ties in the manner shown in FIG. 1 with the advantages mentioned; also, strainer cones as 75 are installed, advantageously at each control unit housing, in both the pressure and return line, to clean the fluid as described above.

The best modes contemplated for practicing the invention have been disclosed but the subject matter within the principles thereof, sought to be patented, is specified in the appended claims.

I claim:

1. In a railroad classification yard where car retarders, operated by hydraulic rams, are installed respectively along individual classification tracks supported by rail ties, a distribution system for the hydraulic fluid comprising:

support ties located beneath selected of said rail ties and presenting a support extension outward of the rail ties at each side of a classification track;

a pump housing supported by an extension at one side of a track in the classification yard, said pump housing containing a pump and a reservoir for supplying hydraulic fluid under pressure to the retarder rams;

a housing containing controls, including directional flow control valves, supported on an extension at the other side of the same track, with intervening rail ties between the two housings so that if one housing tilts due to an unexpected load the other housing is not necessarily tilted;

a single conduit connected to a first fitting on the control housing, in turn communicating with the control valves, and extending longitudinally between the rails of said classification track and said conduit having branches connected to the rams of that retarder to both supply hydraulic fluid under pressure thereto and receive return fluid therefrom; and a pair of conduits extending laterally of said classification track, one to supply fluid from the pump and one to return fluid to the reservoir, and each having its opposite ends joined respectively to additional fittings on the two housings to exchange fluid between the pump, the reservoir and the control valves.

2. A distribution system according to claim 1 wherein said first fitting is on the side of the control housing adjacent to the classification track; wherein said single conduit includes a flexible hose connected to said first fitting, wherein additional fittings on the two housings are at the ends of the housings which face toward one another and wherein each conduit in said pair of conduits include a flexible hose connected to a respective one of said additional fittings.

3. A distribution system according to claim 1 wherein the conduits of said pair are parallel to one another and are located between an adjacent pair of rail ties.

4. A distribution system according to claim 1 wherein a conduit for return fluid and a conduit for pressure fluid are each equipped with a strainer cone having its apex pointed upstream.

5. A distribution system according to claim 4 wherein the retarders are spring closed and wherein the directional control valves, when the system is not operating, release hydraulic fluid to the reservoir so the retarder remains closed.

6. A distribution system according to claim 5 wherein at least one of the conduits is equipped with a cone-shaped fitter screen having its apex pointing upstream.

7. In a railroad classification yard where a hydraulically operated car retarder is installed at a classification track supported by rail ties, a distribution system for hydraulic fluid comprising:
   a pair of support means located outward of the rail ties at each side of the classification track;
   a pump housing supported by one support means at one side of the classification track, said pump housing containing a pump and a reservoir for supplying hydraulic fluid under pressure to the retarder;
   a housing containing a directional flow control valve means supported on the other support means at the other side of the same track;
   a single conduit communicating with the control valve means and extending longitudinally between the rails of the classification track to both supply hydraulic fluid under pressure thereto and receive return fluid therefrom; and
   a pair of flexibly supported conduits between the two housings and so connected to the pump, the reservoir and the control valve means as to enable fluid to be returned from the retarder to the reservoir and fluid under pressure to be pumped to the retarder from the reservoir.

8. A distribution system according to claim 7 wherein there is a first fitting on the side of the control housing adjacent to the classification track in communication with the directional flow control valve means, said single conduit including a flexible hose connected to said first fitting, a pair of additional fittings on the two housings located at the ends of the housings which face toward one another, said additional fittings in each pair being respectively in communication with the reservoir and the pump, and wherein each conduit in said pair of conduits includes, at each end, a flexible hose connected to a respective one of said additional fittings.

9. A distribution system according to claim 8 wherein the conduits of said pair are parallel to one another and are located between an adjacent pair of rail ties.

10. A distribution system according to claim 9 wherein a conduit for return fluid and a conduit for pressure fluid are each equipped with a strainer cone having its apex pointed upstream.

11. A distribution system according to claim 9 wherein the retarder is spring closed and wherein the directional control valve means, when the system is not operating, releases hydraulic fluid to the reservoir so the retarder remains closed.

12. A distribution system according to claim 7 wherein at least one of the conduits is equipped with a cone-shaped filter screen having its apex pointing upstream.

13. In a railroad classification yard where a plurality of hydraulically operated car retarders, operated by rams, are installed at separate classification tracks, a distribution system for hydraulic fluid comprising:
   a pump housing supported at the side of the one of the tracks containing both a pump and a reservoir for supplying fluid under pressure to each of the retarder rams and for storing the fluid returned therefrom;
   a plurality of control unit housings, one for each retarder, each independently supported at one side of each track, each control unit housing containing directional control valve means for controlling the flow of fluid to and from the related retarder independently of each other retarder;
   a single retarder ram pipe extending parallel to each track for both supplying fluid to and receiving fluid from the related retarder, said retarder ram pipe communicating with the related directional control valve means;
   a pressure supply manifold and a fluid return manifold parallel thereto, both manifolds extending transverse to the tracks, combined with branch pressure and return conduits parallel to the tracks and respectively communicating with the manifolds at one end and with the directional control valve means at the other end; and
   a pressure supply pipe and return pipe respectively connected to the pump and reservoir and to the respective manifolds.

14. A distribution system according to claim 13 wherein each control unit housing is supported at the end of a railroad tie.

15. A distribution system according to claim 14 wherein the pressure supply pipe and return pipe extend transverse to the tracks and wherein bends in the distribution system for fluid are accomodated by hoses.

16. A distribution system according to claim 13 wherein each retarder is spring closed and wherein the directional control valve means, when a retarder is not operating, releases hydraulic fluid to the reservoir so the retarder remains closed.

17. A distribution system according to claim 16 wherein fluid flow occurs through a cone-shaped filter screen having its apex pointing upstream.

18. A distribution system according to claim 7 wherein said housings are so dimensioned as not to delimit the walking space at the side of the track even when a car is on the track.

* * * * *